(12) United States Patent
Fujita et al.

(10) Patent No.: US 6,575,394 B1
(45) Date of Patent: Jun. 10, 2003

(54) SEAT BELT RETRACTING DEVICE

(75) Inventors: Hitoshi Fujita, Tokyo (JP); Ryuji Yano, Tokyo (JP); Hiroaki Fujii, Tokyo (JP); Hiromasa Tanji, Tokyo (JP)

(73) Assignee: Takata Corporation, Tokyo (JP)

( * ) Notice: Subject to any disclaimer, the term of this patent is extended or adjusted under 35 U.S.C. 154(b) by 3 days.

(21) Appl. No.: 09/680,948

(22) Filed: Oct. 10, 2000

Related U.S. Application Data

(60) Provisional application No. 60/158,367, filed on Oct. 12, 1999.

(30) Foreign Application Priority Data

Nov. 11, 1999 (JP) .......................................... 11-320876
Sep. 4, 2000 (JP) ...................................... 2000-266526

(51) Int. Cl.⁷ ............................................. B60R 22/34
(52) U.S. Cl. .................................. 242/390.8; 280/807
(58) Field of Search .................... 242/390.8, 390.9; 280/806, 807; 297/478

(56) References Cited

U.S. PATENT DOCUMENTS

| | | | | |
|---|---|---|---|---|
| 3,986,093 A | * | 10/1976 | Wakamatsu | 318/484 |
| 4,002,219 A | * | 1/1977 | Steinmann | 297/475 |
| 4,478,433 A | * | 10/1984 | Taguchi et al. | 180/268 |
| 4,659,108 A | * | 4/1987 | Sack | 280/807 |
| 4,666,097 A | * | 5/1987 | Tsuge et al. | 180/268 |
| 4,723,728 A | * | 2/1988 | Kanada et al. | 242/385 |
| 4,787,569 A | * | 11/1988 | Kanada et al. | 242/371 |
| 5,520,263 A | * | 5/1996 | Suran | 180/270 |
| 5,552,986 A | * | 9/1996 | Omura | 701/45 |
| 5,558,370 A | * | 9/1996 | Behr | 280/806 |
| 6,213,512 B1 | * | 4/2001 | Swann | 280/806 |
| 6,257,363 B1 | * | 7/2001 | Midorikawa | 180/268 |
| 6,332,629 B1 | * | 12/2001 | Midorikawa et al. | 242/390.8 |

FOREIGN PATENT DOCUMENTS

JP    2001199309 A  *  7/2001  ........... B60R/22/48

* cited by examiner

Primary Examiner—John M. Jillions
(74) Attorney, Agent, or Firm—Foley & Lardner

(57) ABSTRACT

A seat belt retracting device having a motor for retracting a seat belt having a tongue adapted to engage a buckle. The device includes an electrical circuit for controlling operation of the motor with a one-chip integrated circuit (IC). The circuit includes a control output power circuit; a motor control power circuit; and a communication control power circuit. The motor is configured to operate for a first prescribed period of time to retract the seatbelt from the moment at which disengagement between the buckle and the tongue is detected.

6 Claims, 6 Drawing Sheets

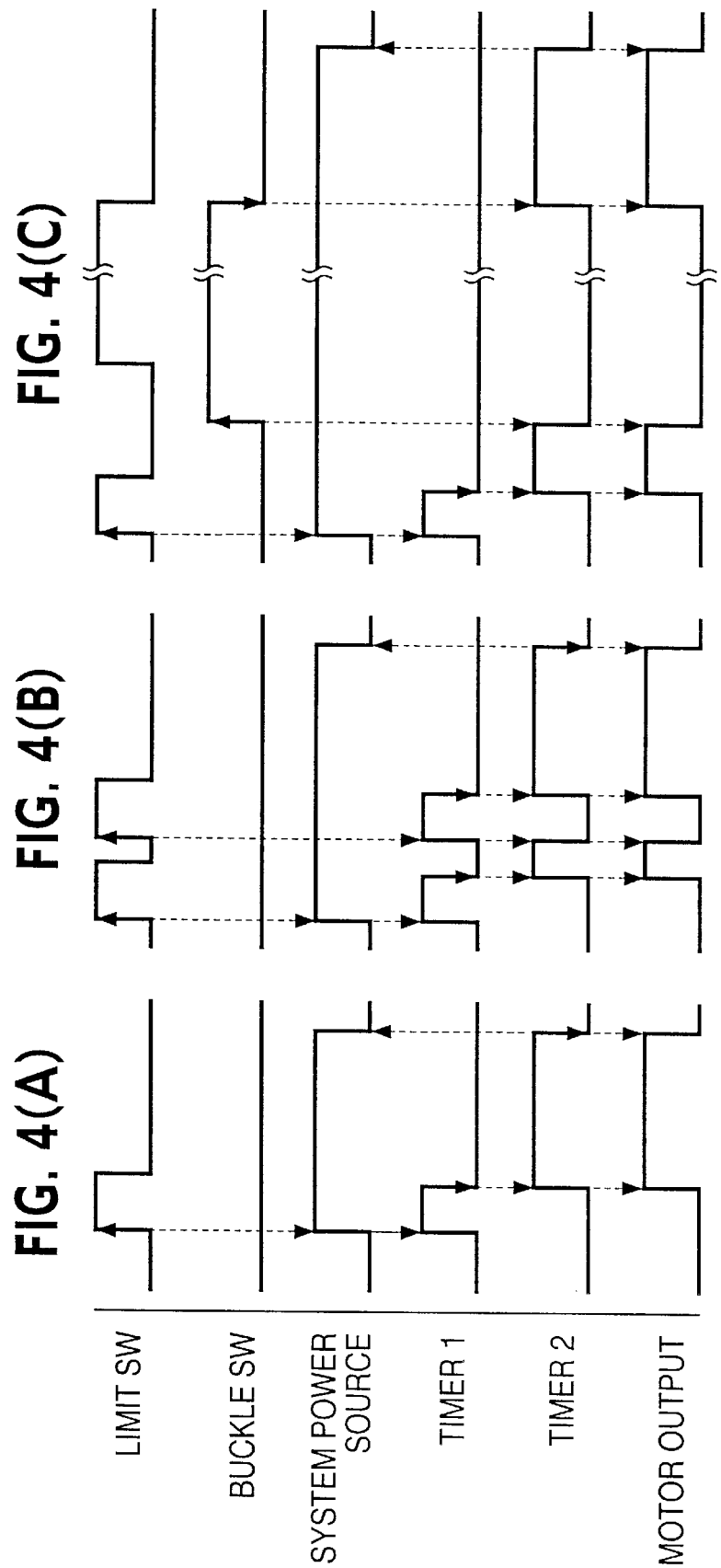

SEAT BELT RETRACTING DEVICE

This application is related to U.S. provisional application Ser. No. 60/158,367, filed Oct. 12, 1999; Japanese Patent application No. H11-320876, filed Nov. 11, 1999, and Japanese Patent Application 2000-266,526, filed Sep. 4, 2000, the disclosures of which are herein incorporated by reference in their entirety.

FIELD OF INVENTION

The present invention relates to a seat belt retracting device to be mounted on a vehicle, such as a passenger vehicle and, more specifically, to a seat belt retracting device comprising a motor for retracting, or retracting and unwinding of the seat belt.

DESCRIPTION OF THE RELATED ART

The seat belt retracting device to be mounted on the automotive vehicle or the like has a function to wind up the excessive portion of the unwound seat belt after the passenger seated on the seat pulls the seat belt out and attaches the tongue to the buckle unit. In order to realize this function, a single return spring is generally used in the conventional seat belt retracting device. When fastening the seat belt, a passenger pulls out the seat belt against the energy of the return spring, and when he or she engages the tongue with the buckle and moves the hands off, the excess portion of the belt that has been pulled out is retracted by a force of the return spring back into the seat belt retracting device until the seat belt fits to the human body.

The seat belt retracting device necessarily satisfies the following objects simultaneously: (1) to reliably retract the excessively pulled out seat belt until it fits to the human body, and when it is not worn by a passenger, to retract the seat belt that is pulled out into the receiving portion completely; and (2) to not give the passenger a feeling of being excessively pressed on his or her breast or the like when the belt is normally fastened.

However, when a spring is used that has less energy to reduce the passenger's feeling of being excessively pressed on his or her torso, the retracting force to retract (store) the belt is lowered, thereby lowering the operability and storability. In contrast, when a spring having a stronger energy is used, the retractor exhibits a sufficient retracting force when retracting the seat belt, and the passenger's feeling of being excessively pressed on his or her torso when the seat belt is normally fastened increases.

One suggested way to solve this tension problem is a method of using a motor in conjunction with a return spring for retracting the seat belt, as disclosed for example in Japanese Patent Publication Application No. 9-132113.

When retracting, or retracting and unwinding the seat belt with a motor alone, detectors such as a buckle switch or a limit switch for detecting manual unwinding of the seat belt are provided and the output thereof is fed to the microcomputer-based electrical circuit to drive the motor by the output from the electrical circuit.

The electrical circuit is formed by mounting circuit elements on the printed board having a printed wiring thereon and treated as a separate unit from the body of the seat belt retractor (in this specification, a unit of mechanical parts having a function to transmit a force of the return spring or the motor to the retracting spool which retracts the seat belt is referred to as the body of the seat belt retractor).

FIG. 5 shows a structure of the conventional seat belt retracting device and an example of connection therein. The body of the seat belt retractor comprises a limit switch for detecting unwinding of the seat belt and a motor installed therein. The electrical circuit being a separate unit comprises an external input circuit, a logic power supply unit, a CPU, a sensor input circuit, a noise filter, and a motor drive circuit and so on, which are, as shown in the figure, composed of a plurality of parts such as a general purpose IC, a condenser, and a resistance all mounted on the printed board. The wiring between the buckle switch, battery, and the seat belt retractor body are made by a wire harness, and connected to the printed board.

FIG. 6 shows an advanced example of such a device. In FIG. 6, the electric circuit comprises a communication unit in addition to the circuits shown in FIG. 5, and information is sent to and received from the collision prediction sensor circuit via an electronic communication. The external input circuit can be connected with a child seat switch for detecting whether or not a child seat is mounted, and a service board to be used by the vehicle manufacture for adjustment. There is also provided a control output circuit, so that the solenoid in the body of the seat belt retracting device can be controlled.

In the construction shown in FIG. 5 and FIG. 6, since the electric circuit is composed of a plurality of components, there is a problem in that the number of the components increases and thus the manufacturing cost increases. There is another problem in that a number of processes are required when assembling since the connection between each unit is made by a wire harness. There is still another problem in that the possibility of malfunction caused by imperfect connection may be increased.

SUMMARY OF THE INVENTION

With these circumstances, it is an object of the present invention to provide an electric circuit in which the number of components that constitute the electric circuit is decreased, and the cost for wiring can be reduced.

The first embodiment for solving the problems described above is a seat belt retracting device having a motor for retracting, or retracting and unwinding the seat belt, wherein the electric circuit for controlling operation of the motor comprises a one-chip integrated circuit ("IC").

In this embodiment, since the electric circuit for controlling operation of the motor (the portion shown as an electric circuit in FIG. 5 and FIG. 6 for controlling the sensor, solenoid, and the motor) comprises a one-chip IC, the number of the components can be significantly reduced in comparison with the conventional electric circuit, and the circuit may be miniaturized as a whole.

The second embodiment for addressing the problems described above is the first embodiment, but with the one-chip IC mounted on the body of the seat belt driving unit.

Since the circuit can be miniaturized as a whole by constituting the electric circuit by a one-chip IC, the IC can be mounted on the body of the seat belt driving unit. Accordingly, the wiring to the motor, or the wiring to the limit switch for detecting the seat belt retraction can be made within the body of the seat belt driving unit without a wire harness or a connector, thereby facilitating assembly of the seat belt driving unit to the vehicle, and the problem of imperfect connection is reduced because the number of connectors is reduced. Efficiency in terms of the space is improved by utilizing the case portion of the body of the seat belt driving unit for mounting the one-chip IC.

The third embodiment for solving the problems described above is the second embodiment, with at least a part of the wiring within the body of the seat belt driving unit out of the wirings connected to the one-chip IC, the motor, and the detector for controlling the motor is formed integrally with the case or the plate within the body of the seat belt retracting device. At least a part of the wiring within the body of the seat belt driving unit is integrally formed with the case or the plate within the body of the seat belt retracting device by insert molding or printed wiring. Accordingly, it is not necessary to perform such wiring within the body of the seat belt retracting device, thereby facilitating the assembling process of the body of the seat belt driving unit.

The fourth embodiment for solving the problems described above is the third embodiment, with the connector for connecting the case or the plate and the wiring from the detector being integrally formed with the case or the plate. Since the connector for connecting the case and the wiring from the detector is integrally formed with the case or the plate, additional connector is not required. Therefore, the wiring to the connector is not necessary, thereby facilitating the assembling process.

The fifth embodiment for solving the problems described above is any one of the first embodiment to the fourth embodiment, with at least one of the control output power circuit, the motor control power circuit, and the communication control power circuit out of the electric circuits comprising a one-chip IC that is not supplied with power in normal condition, but supplied only during the period from the moment at which the unwinding of the belt is detected until the retracting operation of the motor is complete, and during the period that the engagement between the buckle and the tongue is being detected.

At least one of the control output power circuit, the motor control power circuit, and the communication control power circuit needs not to be supplied with power all the time, and thus it may be constructed in such a manner that power is supplied only when the passenger is present and operating the seat belt, and when the passenger is wearing the seat belt. In this embodiment, since these circuits are not supplied with power in normal condition, but supplied with power only during the period from the moment at which the unwinding of the belt is detected until the retracting operation of the motor is complete and during the period that the engagement between the buckle and tongue is being detected, battery power consumed in these circuits may be reduced.

The sixth embodiment for solving the problems described above is any one of the first embodiment to the fifth embodiment, wherein retraction of the belt by the motor is carried out for a first prescribed period of time from the moment at which the disengagement between the buckle and the tongue is detected. The retraction of the belt by the motor is also carried out for the first prescribed period of time after a second prescribed period of time has elapsed from the moment at which the unwinding of the seat belt is detected while the engagement between the buckle and the tongue is not being detected. If the re-unwinding of the seat belt is detected during retraction of the belt by the motor then retraction of the belt by the motor is stopped. Retraction of the belt by the motor is carried out again for the first prescribed period of time after the second prescribed period of time has elapsed without engagement between the buckle and tongue being detected. In this embodiment, retraction by the motor is not carried out while the engagement between the buckle and the tongue is being detected.

In this embodiment, when the disengagement between the buckle and the tongue is detected, retraction by the motor is carried out only for the first prescribed period of time. The first prescribed period of time is normally set in advance to the length during which the seat belt can be retracted completely from the state of being engaged with the buckle. When the fact that the seat belt is pulled out by a passenger is detected, the motor starts retraction of the seat belt after the second prescribed period of time has elapsed. The second prescribed period of time is set in advance to the length of time during which the seat belt can be pulled completely to the state of being engaged with the buckle. In the case where the engagement is not made during this second period of time, it is considered that the passenger has made the pulling action to allow the seat belt to be retracted, and the motor is operated for the first prescribed period of time to retract the seat belt.

When the fact that the seat belt is pulled out by a passenger is detected while the seat belt is being retracted, retraction by the motor is stopped once, and started again after the second period of time has elapsed from that moment. It is because the passenger may want to pull the seat belt again to engage the tongue with the buckle, and in such a case, the action of the passenger should not be hindered.

With this sequence, the seat belt can be more smoothly retracted.

BRIEF DESCRIPTION OF THE DRAWINGS

FIGS. 4(a) to 4(c) are time charts showing the examples of the action of the seat belt retracting device as an example of the embodiment of the present invention.

DETAILED DESCRIPTION OF THE PREFERRED EMBODIMENT

Figure 1:
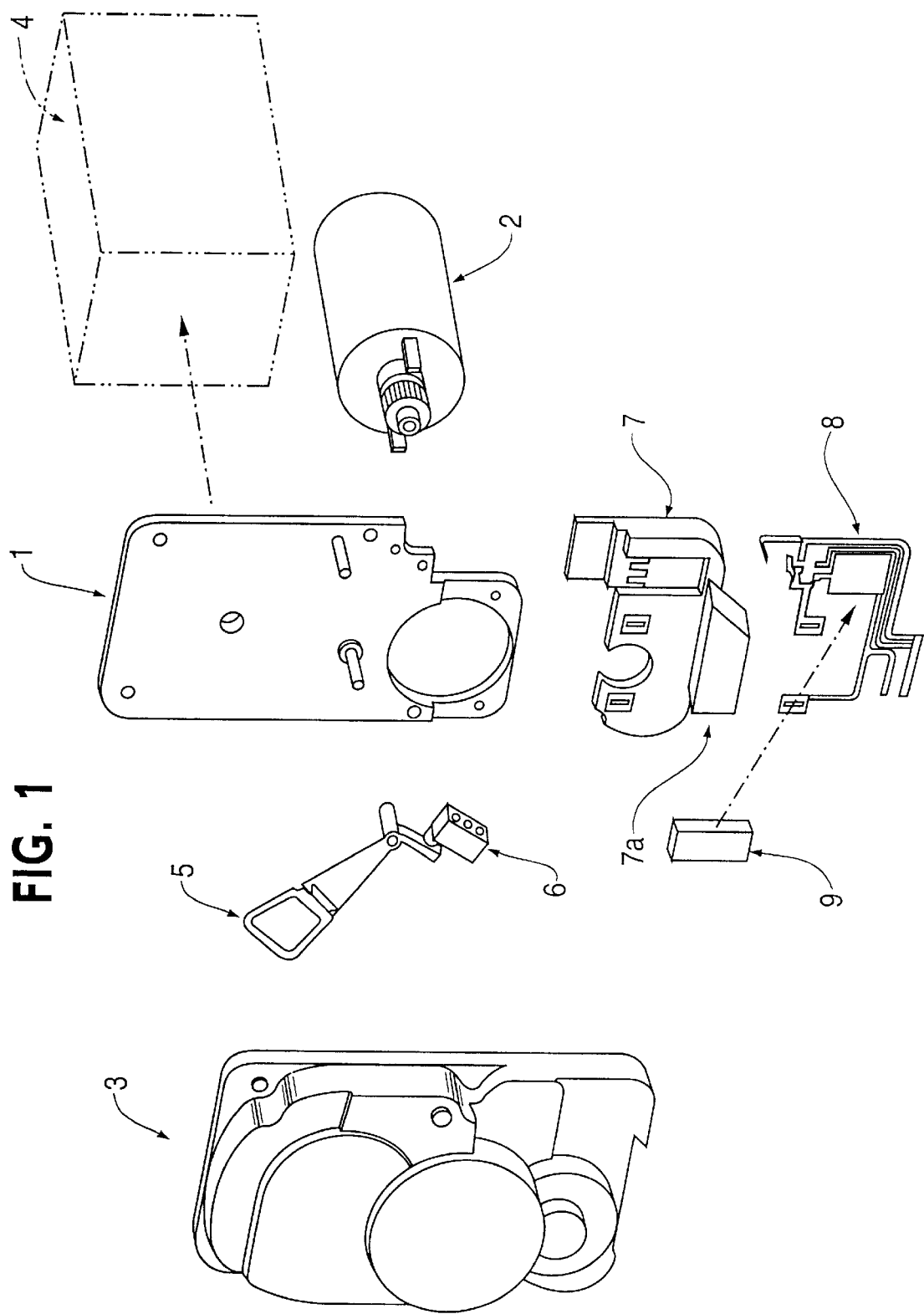
FIG. 1 is an exploded perspective view showing a general outline of the seat belt retracting unit as an example of this embodiment of the present invention.

Referring now to the drawings, an embodiment of the present invention will now be described. FIG. 1 is an exploded perspective view showing a general outline of an embodiment of the seat belt retracting device according to the present invention, provided that the buckle switch is not shown in the figure.

A motor 2, a motor torque transmission mechanism and cover 3, a retractor 4, a switch plate 5, and a limit switch 6 are mounted on the base plate 1. The retractor 4 is a mechanism for retracting the seat belt by winding it on the spool, and the motor torque transmission mechanism is a mechanism for transmitting the torque of the motor to the spool. The switch plate 5 and the limit switch 6 are used for detecting unwinding of the seat belt. The construction described so far is the same as that of the conventional seat belt, and these components constitute the body of the seat belt retracting device.

In this embodiment, the wiring case 7 is provided and fixed on the base plate 1. In the wiring case 7, a wiring 8 is embedded integrally within the wiring case 7 by insert molding. A part of the wiring case 7 constitutes a connector portion 7a, to which the power cable from the battery and the wiring from the buckle switch are connected. A part of the wiring 8 extends into the connector portion 7a and forms a connector pin.

The wiring 8 has pin shaped portions which are to be located in the vicinity of the terminals of the motor 2 and the limit switch 6. Therefore, the wirings between the motor 2 and limit switch and the electric circuit will be completed by soldering the pin-shaped portions of the wiring 8 and the terminals of the motor 2 and the limit switch 6 with the wiring case 7 fixed on the base plate 1.

Figure 5:
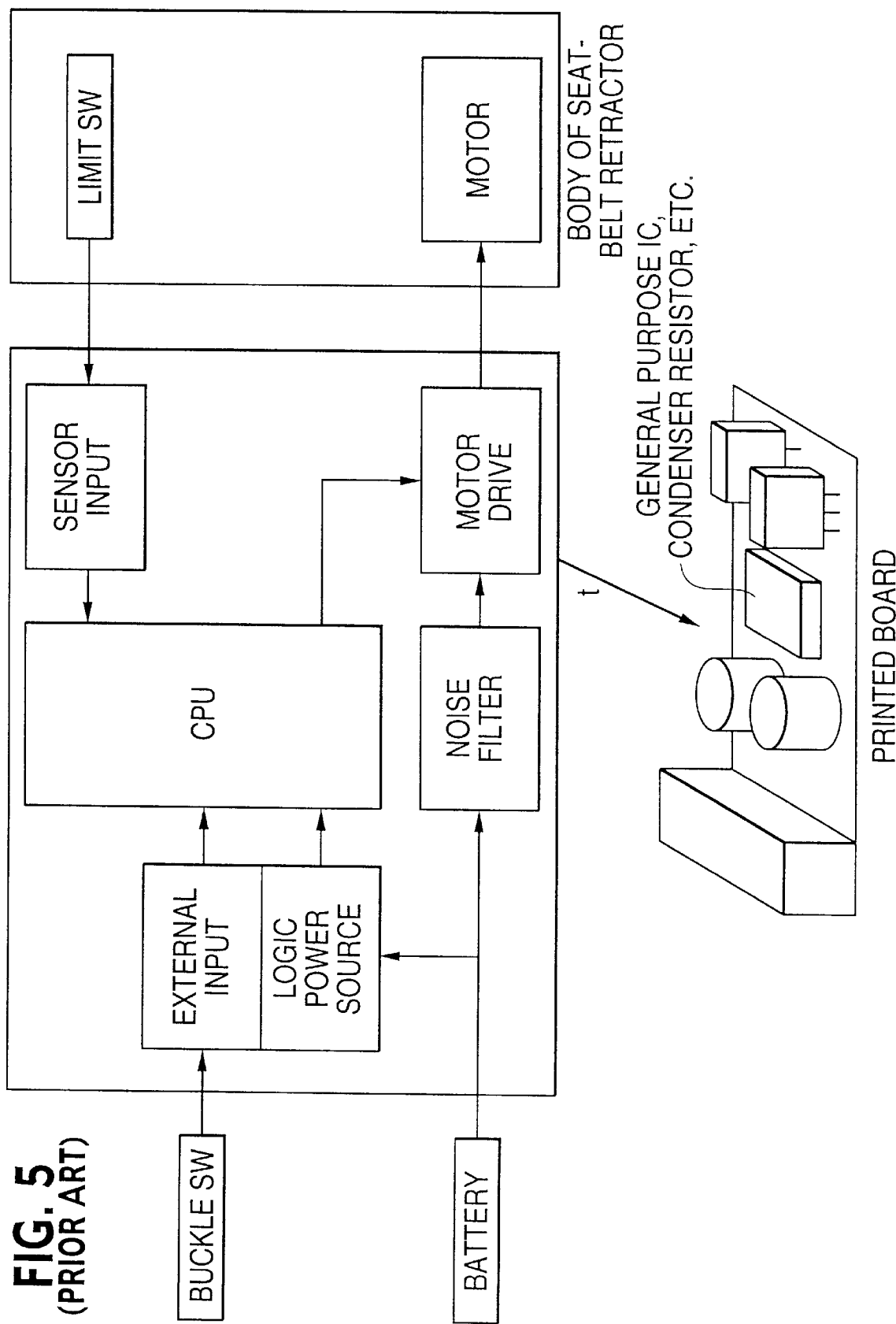
FIG. 5 is a drawing showing an example of the construction and connection of the unit of a known seat belt retracting device.
Figure 6:
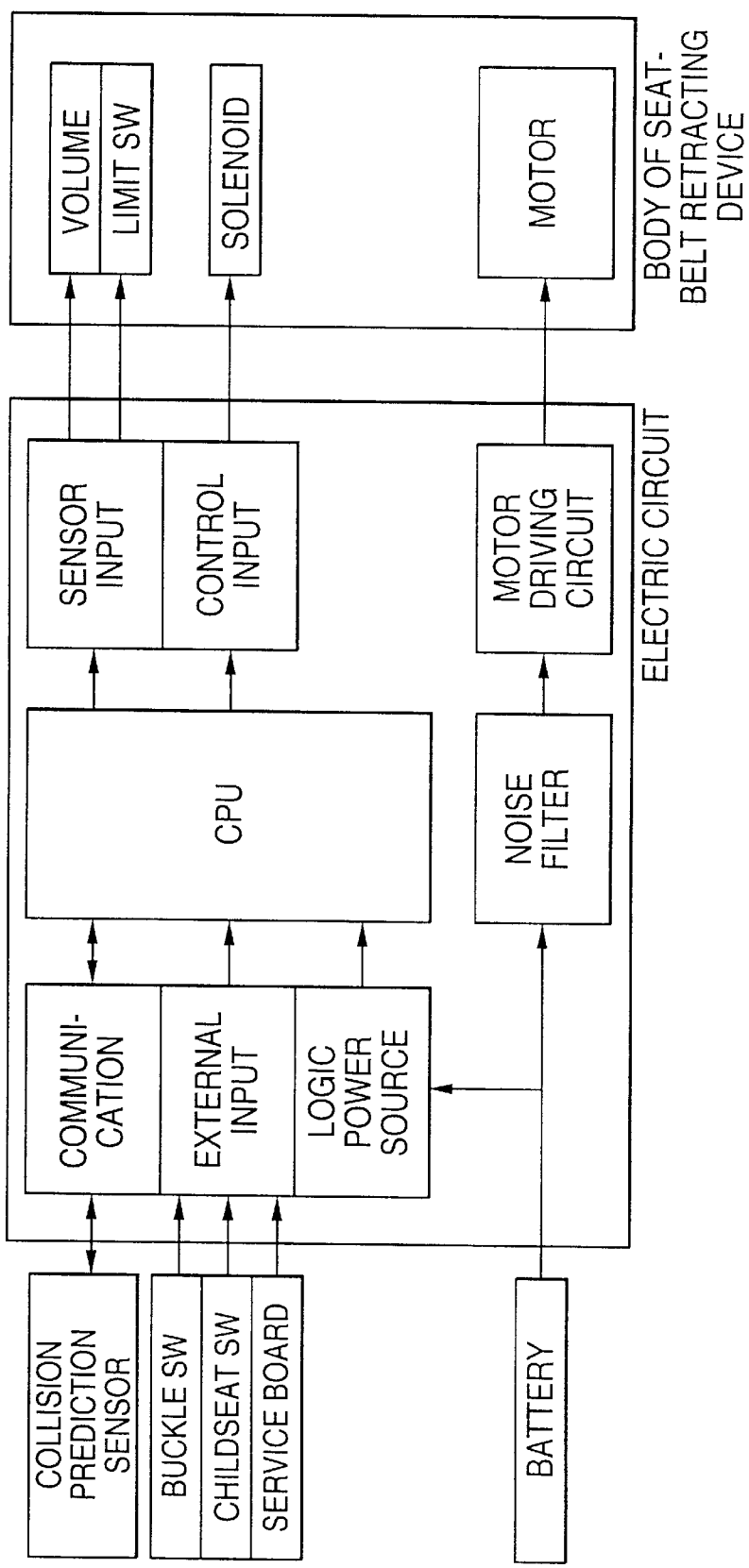
FIG. 6 is a drawing showing an example of the construction and connection of the unit of a known seat belt retracting device.

The electric circuits (portions shown as electric circuit in FIG. 5 and FIG. 6) are accommodated together within the custom IC 9 as a one-chip IC, and arranged on the wiring 8 integrally with the wiring case 7, so that the pin-shaped portions of the wiring 8 and the pin of the custom IC 9 are soldered to perform fixation and wiring of the custom IC simultaneously.

In this arrangement, the electric circuits can be mounted on the body of the seat belt retracting device, and the wiring between the motor 2 and the limit switch 6 and the electric circuits (custom IC 9) can be established only by soldering. Since the connector portion 7a is integral with the wiring case 7 and a part of the wiring 8 forms a connector pin, an additional connector is not needed.

Figure 2:
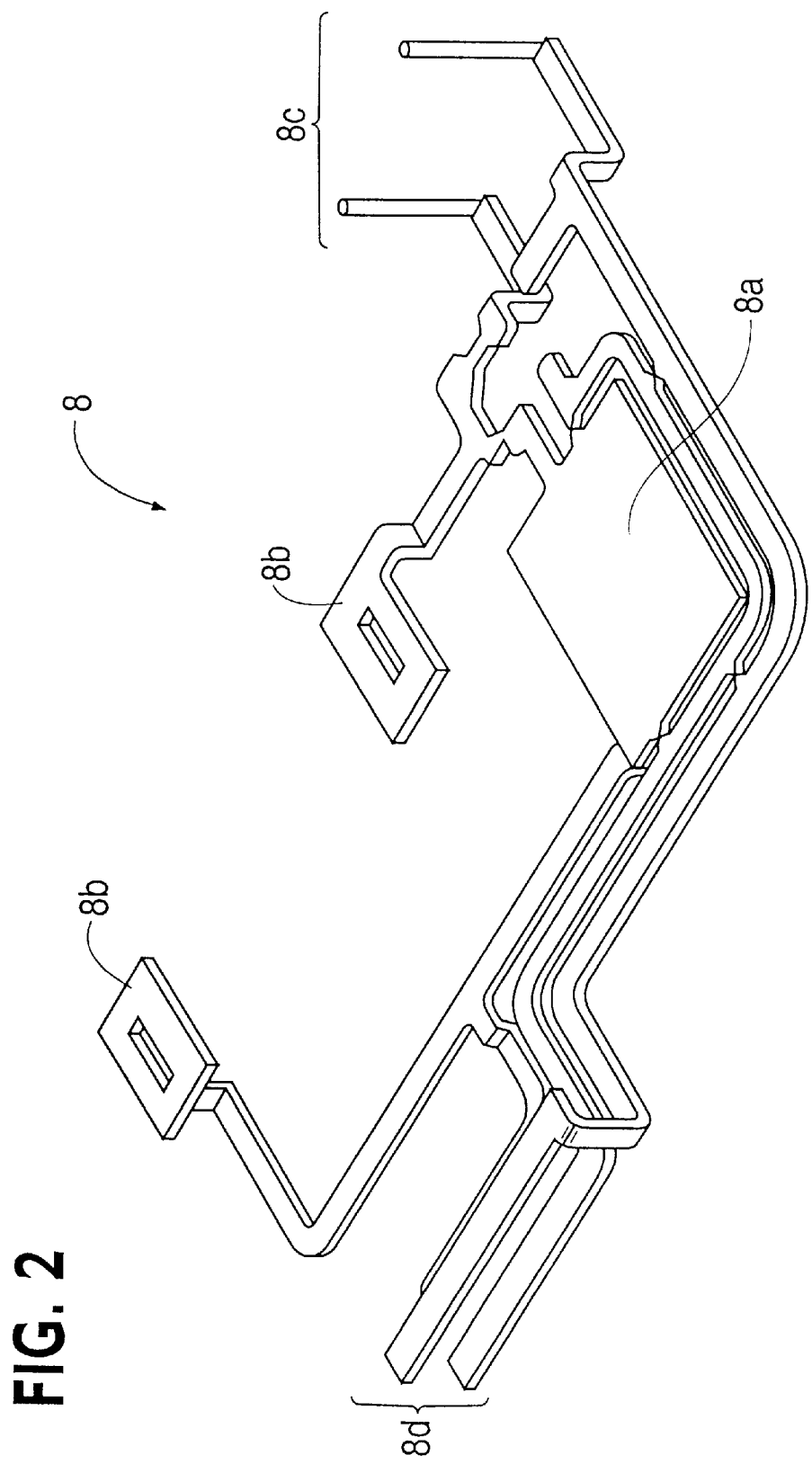
FIG. 2 is a perspective view showing the construction of the wiring.

FIG. 2 is a perspective view showing the structure of the wiring 8. In FIG. 2, 8a denotes an IC receiving portion, and 8b denotes a motor connecting pin portion, 8c denotes a limit switch connecting pin portion, and 8d denotes the connector pin portion. The wiring 8 having such a spatial structure is insert-molded in the wiring case 7.

Figure 3B:
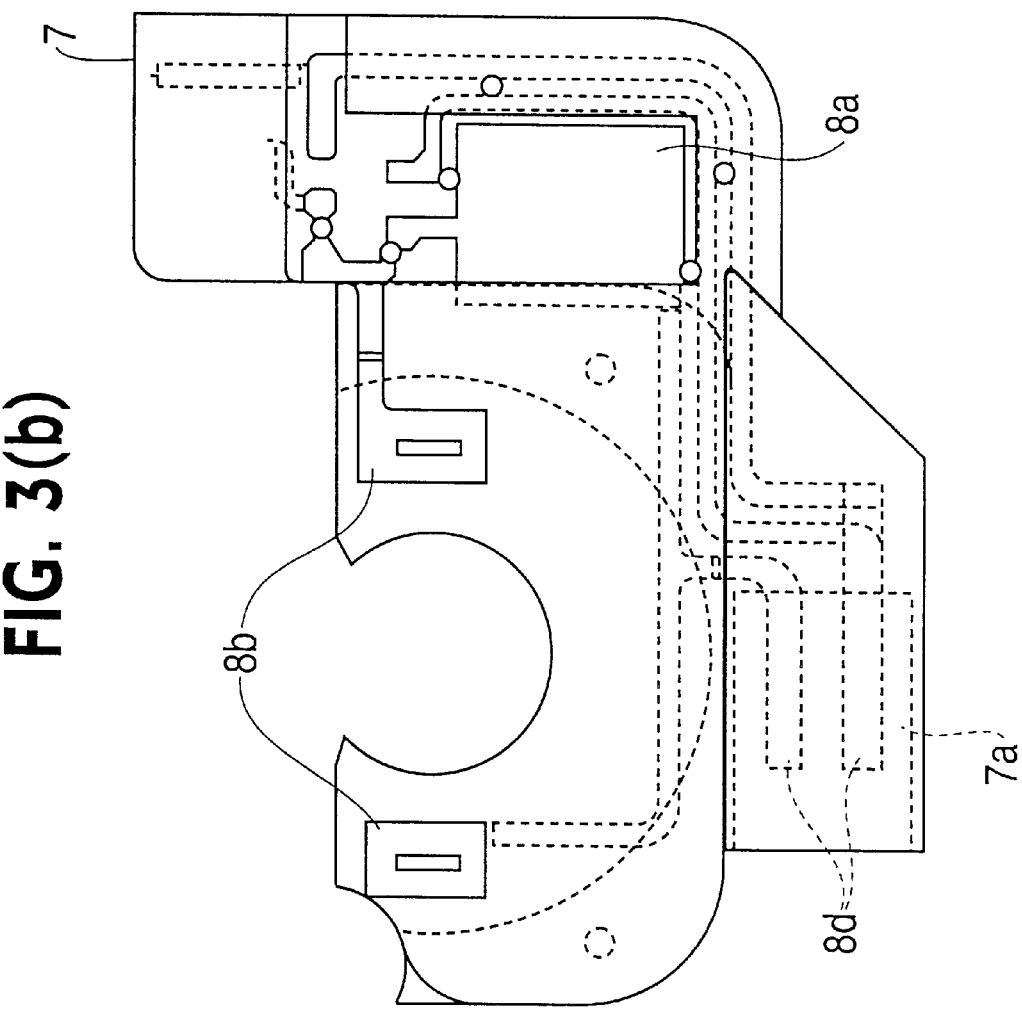
FIG. 3(a) is a side view showing a structure of the wiring case 7 with the wiring insert-molded and FIG. 3(b) is a top view of the structure in FIG. 3(a).
Figure 3A:
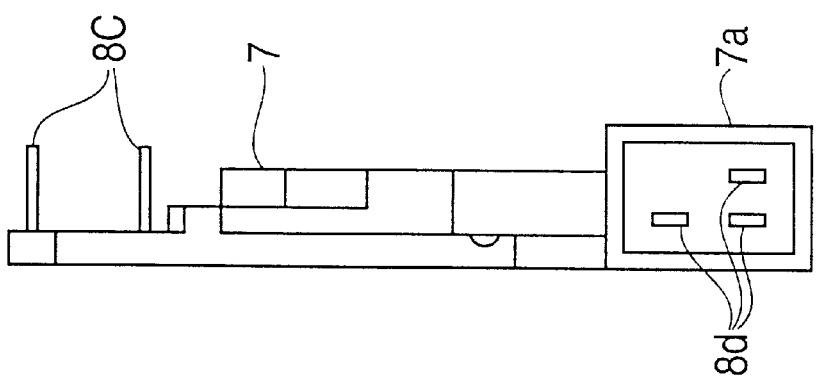

FIGS. 3(a) and 3(b) show the structure of the wiring case 7 with the wiring 8 insert-molded. The principal portion of the wiring is molded within the wiring case 7. Only the portions that need to be connected with the electric components, such as the IC receiving portion 8a, the motor connecting pin portion 8b, the limit switch connecting pin portion 8c, and the connector pin portion 8d are exposed to the outside.

Though the additional wiring case 7 is provided in the embodiment as described thus far, it is also possible to omit the wiring case to allow the cover (a kind of case) of the body of the seat belt retractor or the base plate (a kind of plate) to have a function of the wiring case 7 as described above.

FIGS. 4(a) to 4(c) are time charts showing the action of the electric circuits, which are formed in the custom IC in the manner described above. In the Figures, the line shown as a limit SW (switch) represents the output of the components corresponding to the limit switch 6 in FIG. 1, which goes up to the high level when the retractor 4 is rotated in the unwinding direction. The line shown as a buckle SW (switch) represents a sensor signal, which goes up to the high level when the buckle and the tongue are engaged. The system power source embodiment a power source that is supplied to the control output power circuit, the motor control power circuit, and the communication control power circuit out of the electric circuits comprising a custom one-chip IC.

FIG. 4(a) represents the action of a passenger pulling the seat belt out a little so as to allow the seat belt to be retracted. When the passenger pulls the seat belt a little, the limit SW signal goes up to the high level, thereby turning the system power source ON and actuating the timer 1. The timer 1 is set for the maximum period of time needed for a passenger to pull out the seat belt and engage the tongue to the buckle. Therefore, when the signal from the buckle SW does not go up to the high level before the timer 1 expires, it is considered that the passenger has pulled out the seat belt without the intention of wearing the seat belt.

Therefore, in such a case, the expiration of the timer 1 allows the timer 2 to start counting. The output is supplied from the motor and retraction of the seat belt by the motor is carried out while the timer 2 is counting. The timer 2 is set for the period of time during which the seat belt can be retracted completely from the moment at which the engagement between the buckle and the tongue is released. In this arrangement, when a passenger applies a pulling force to the seat belt, it can be retracted reliably.

FIG. 4(b) is a time chart representing the action taken in case where the seat belt is pulled out during retraction of the seat belt after the action in FIG. 4(a). In this case, the timer 2 is reset when the limit switch rises for the second time, whereby the motor output is turned off. Then from this moment, the same action as shown in FIG. 4(a) is carried out. This is a sequence to stop the retraction of the seat belt by pulling the seat belt out in the case where the passenger needed unexpectedly long time to wear the seat belt and thus the retraction of the seat belt has started.

FIG. 4(c) is a time chart representing the action when a passenger pulled out the seat belt to wear the same. In this case, the seat belt starts retracting as shown in FIG. 4(a) in the first place. However, when the buckle and the tongue are engaged and the signal of the buckle SW goes up to the high level, the timer 2 is reset and thus the motor output is turned off and the retraction stops. When the seat belt is released from this state, and the signal of the buckle SW goes down to the low level, the timer 2 is actuated and the seat belt is retracted by the motor for a preset period of time.

The period of time during which the system power source is ON is the period that the signal of the buckle SW is in the high level, in other words, the period during which the seat belt is being worn, and the period from the rise of the signal of the limit switch to the reset or the expiration of the timer 2.

As is described thus far, since the electric circuit comprises a one-chip IC, the number of the components can be significantly reduced and thus the circuit can be miniaturized as a whole.

In addition, the process for assembling the seat belt driving unit to the vehicle is facilitated, and the problem of the imperfect connection is reduced because the number of the connectors is reduced.

In addition, the process for assembling the body of the seat belt driving unit is facilitated.

In addition, the wiring to the connector is not necessary, and thus the process for assembling is further facilitated.

Further, the need for a battery power consumed at the control output power circuit, the motor control power circuit, and the communication control power circuit can be reduced.

Therefore, through this invention, the belt can be retracted smoothly.

While the present invention has been described by way of example and in terms of preferred embodiments, it is understood that the invention is not limited thereto. The scope of the appended claims should be interpreted to encompass all such modifications, similar arrangements and procedures.

We claim:

1. A seat belt retracting device having a body containing a motor for retracting or retracting and unwinding the seat belt, comprising a one-chip integrated circuit (IC) for controlling operation of the motor, wherein the one chip IC is mounted on the body of the seat belt retracting device and includes a control output power circuit, a motor control power circuit, a communication control power circuit; and wiring connecting the one-chip IC, the motor, and a switch for controlling the motor, and wherein a portion of the wiring is integrally formed within the body of the seat belt retracting device.

2. The seat belt retracting device of claim 1, wherein at least a part of the wiring within the body of the seat belt retracting device is embedded within a case or a plate within the body of the seat belt retracting device.

3. The seat belt retracting device of claim 2, wherein a connector for connecting the case or the plate and the wiring from the switch is integrally formed within the body of the seat belt retracting device.

4. The seat belt retracting device of claim 1, wherein one of the control output power circuit, the motor control power circuit, and the communication control power circuit is not supplied with power in during a normal operating condition but is supplied with power only during a period from the moment at which an unwinding of the belt is detected until a retracting operation of the motor is complete, and engagement between a seat belt buckle and tongue is detected.

5. A seat belt retracting device having a motor for retracting a seat belt having a tongue adapted to engage a buckle, comprising an electrical circuit for controlling operation of the motor with a one-chip integrated circuit (IC) comprising:

a control output power circuit;

a motor control power circuit; and a communication control power circuit;

wherein the motor is configured to operate for a first prescribed period of time after an unwinding of the seatbelt is detected to have continued for a second period of time without engagement of the buckle and the tongue being detected.

6. A seat belt retracting device having a motor for retracting a seat belt having a tongue adapted to engage a buckle, comprising an electrical circuit for controlling operation of the motor with a one-chip integrated circuit (IC) comprising:

a control output power circuit;

a motor control power circuit; and a communication control power circuit;

wherein the motor is configured to stop operating when the unwinding of the seat belt is detected while the motor is operating to retract the seat belt; and wherein the motor is configured to restart and operate for a first prescribed period of time after the seat belt is unwound for a second prescribed period of time; and wherein retraction of the seat belt by the motor is not carried out while engagement between the buckle and the tongue is detected.

* * * * *